April 3, 1962  J. A. HINDS  3,028,292
MANUFACTURING PLASTIC ROTOR BLADES
Filed May 27, 1957

INVENTOR.
JAMES A. HINDS
BY
ATTORNEY

United States Patent Office 3,028,292
Patented Apr. 3, 1962

3,028,292
METHOD OF MANUFACTURING PLASTIC ROTOR BLADES
James A. Hinds, Traverse City, Mich., assignor to Parsons Corporation, Detroit, Mich., a corporation of Michigan
Filed May 27, 1957, Ser. No. 661,939
2 Claims. (Cl. 156—214)

This invention refers to the construction of airfoils by the use of plastic materials, and has particular reference to those classes of airfoils, such as helicopter rotor blades, which may advantageously incorporate spars which provide both structural strength and advantageous airfoil balance.

In application Serial No. 621,814, filed November 13, 1956, by Edward E. Swanson et al., now abandoned, a molded construction is shown wherein a spanwise-reinforced aft airfoil structure, laminated of fiberglass and resin materials, is employed with a steel combined leading edge and spar. The present invention embodies certain of the principles there disclosed, but is directed principally to providing a molded plastic airfoil structure which utilizes a molded plastic spar.

Aircraft designers have sometimes sought to mold entire airfoils simultaneously; and at others to make built-up assemblies in which plastic parts are merely substituted for similarly-shaped parts of previously-used materials. Such designs do not meet the problems which plastic construction imposes. It has proved difficult to cure unitary plastic structures where some portions are thick and others thin. When hollow airfoil shells are used, internal reinforcements must be provided. If these are formed separately from each other, the problem arises whether on molding them together a substantially integral structure will actually be achieved. For example, if typical blade construction be copied in plastic, as if a plastic spar be made, aft plastic ribs secured to it, and a plastic skin formed thereover, it is not conservative to consider that the skin will be substantially integral with the spar and ribs. The varying loads and vibrations to which helicopter rotors are subjected are likely to be too severe for any blade so constructed, and to precipitate failure at the joints between such parts.

The objects of the present invention, in greater detail, include: providing a new method wherein preformed parts, such as spars and trailing edge strips, may be incorporated within a substantially integrally-reinforced plastic airfoil; bonding such an airfoil to substantially the entire surface of such a preform in a manner which is wholly reliable for load transfer; and making possible the use of heavy molded preforms which require curing conditions different from those for the reinforced skin structure. The method of constructing a rotor blade according to the present invention consists generally of preforming a heavy plastic spar and if desired, a trailing edge member; then wrapping one or more mandrels with uncured plastic laminae, placing the first of these immediately abutting the spar, and the others chordwise adjacent, ending with the trailing edge member; overwrapping the entire assembly with other uncured plastic laminae, and then curing to form an integral structure.

A preferred form of the present invention is shown the accompanying drawing, in which.

Figure 1:
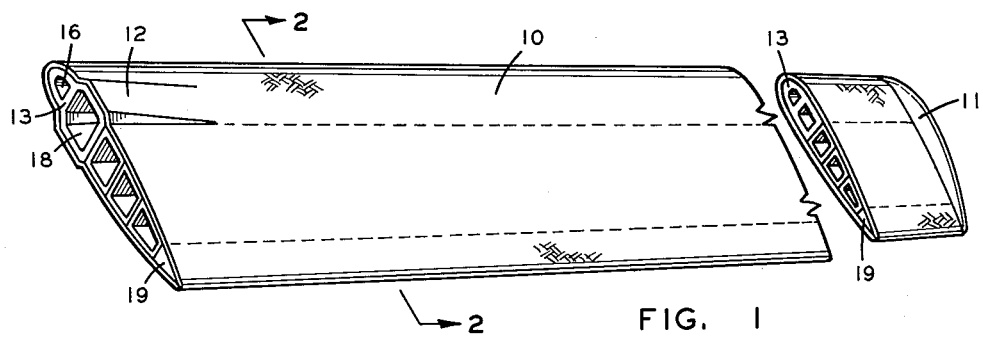
FIGURE 1 is a cabinet projection of a tapered helicopter rotor blade airfoil structure constructed according to the method of and embodying the present invention; and having a locally-enlarged root retention portion at the left end.
Figure 2:
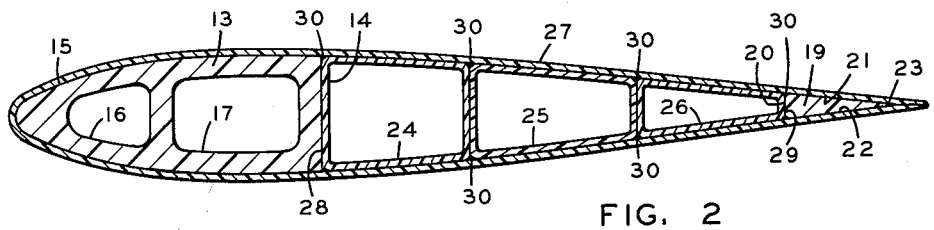
FIGURE 2 is a typical section through the blade structure, taken along line 2—2 of FIGURE 1. The wider cross-hatching indicates preformed parts.

The helicopter rotor blade structure shown in FIGURE 1 is generally designated 10, and may include a faired tip 11 and a taperingly or otherwise enlarged root portion 12 for the attachment of a retention fitting, not shown. The blade may be tapered and twisted as desired. The typical cross-section shown in FIGURE 2 includes a heavy spar 13 which extends from the root to the tip 11. The spar 13 is preferably formed by molding a structural cloth sheet material such as that woven of glass fibers, thoroughly coated and impregnated with fluid polyester resin, and molded to a D-section contour, that is, with an aft surface 14 extending substantially vertically transverse the airfoil section and a curved leading edge surface 15 conforming to the airfoil contour, save that it lies a skin's thickness within the airfoil mold line. Forward and aft hollows, formed within the spar 13 and designated 16 and 17 respectively, are provided to minimize weight and permit better curing than would be feasible if the spar 13 was molded solid. Even with a thickness such as illustrated, wherein a relatively great mass of glass fiber cloth and plastic is provided rather than the few thicknesses ordinarily used to form a laminated skin or a tube, the curing of the plastic involves chemical and thermal reactions which may result in bubbles or other deformations of surface and contour, so that the preformed spar 13 should preferably be sanded after curing.

Any one of the number of possible root retention structures may be provided; for this purpose the aft hollow 17 of the spar 13 may be provided at its root end with a tapering retention cavity enlargement 18.

A somewhat triangular or wedge-shaped trailing edge element 19 may likewise be pre-molded of similar material. It, like the spar 13, may extend the entire span of the blade.

It includes a forward surface 20 which extends substantially vertically transverse the airfoil, and upper and lower surfaces 21, 22 both a skin's thickness within the mold line of the airfoil, and meeting at an aft reinforcement edge 23.

These preformed elements are enveloped in the spanwise-reinforced airfoil structure hereinafter described and whose parts can be considered as integral with each other. They include the following:

The several chordwise-adjacent laminated plastic tubular cells numbered 24, 25 and 26, starting with the cell immediately aft of the spar and having flat walls transverse of the airfoil section and presented in contact with each other like those of the cells in said co-pending application; and The laminated skin 27 which envelops all of the elements heretofore described.

Figure 3:
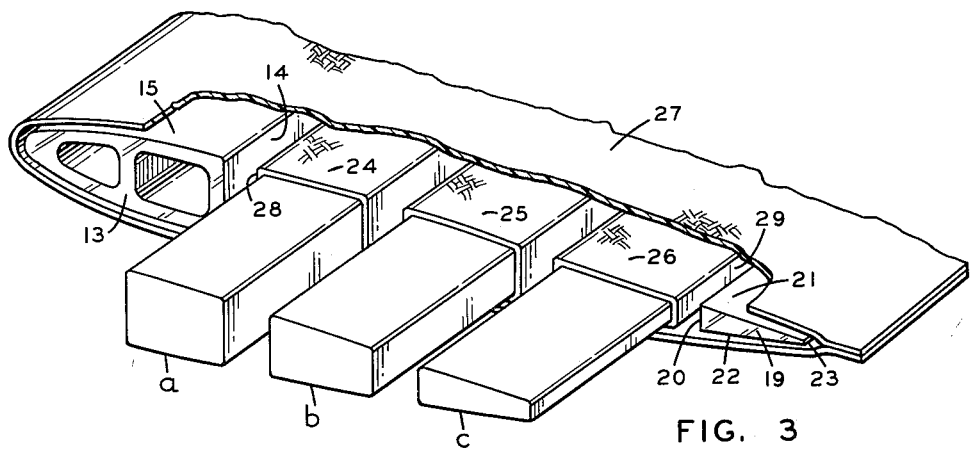
FIGURE 3 is a schematic fragmentary perspective illustrating the general method of construction, showing the parts in exploded relationship.
Figure 4:
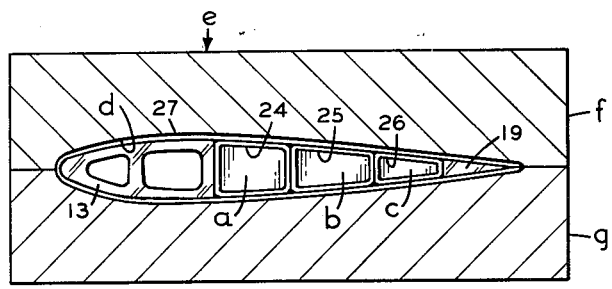
FIGURE 4 is a sketch showing the assembly of FIGURE 3 clamped together in a female mold.

At this stage some further description of the process is in order. The preformed spar 13 and trailing edge element 19 are first molded and cured, and then completed by correcting any surface deviations, as by sanding. Spanwise mandrels a, b and c, shown in FIGURE 3, which may be tapered to provide the cavities of the tubular cells 24, 25 and 26, are wrapped with fiberglass cloth or other similarly laminable sheet material impregnated and coated with fluid polyester resin or other plastic material which is fluid or will be fluid under the particular molding process utilized. The laminable sheet material so impregnated and coated with the fluid plastic is wrapped around the mandrels a, b, c to provide a series of tubular cell-like portions, which are arranged in the order shown in FIGURE 3, so that a substantially flat vertical surface 28 on the forward side of the chordwise forward cell 24 is presented against the vertical aft surface 14 of the spar element 13. Similarly, a vertical surface 29 at the aft side of the last cell 26 is presented against the vertical surface 20 of the trailing edge element 19. Intermediate surfaces of the cells 24, 25, 26 so wrapped are presented adjacent each other. With the wrapped mandrels a, b, c so arranged between the leading edge of the spar 13 and the trailing edge 19, and prior to any hardening or curing thereof, all are over-wrapped together with as many thicknesses as is desired of the fiberglass material impregnated and coated with the same fluid polyester resin as utilized in the cells 24, 25 and 26, to form a complete wraparound skin 27, preferably with the aft edges of the skin arranged adjacent each other and contacting and adjacent the aft reinforcement edge 23. The entire assembly is then clamped within the cavity d (which includes provision for the local root enlargement 12) of a female mold generally designated e and having an upper half f and a lower half g as shown diagrammatically in FIGURE 4. The skin 27 and the tubular cells 24, 25 and 26 are then cured and hardened in the mold e as an integral unit. Excess of the fluid plastic is forced into the small spaces between the corners of the wrappings of the cells 24, 25 and 26 respectively and the skin 27, resulting in plastic fillets 30 which aid in making the structure a unified whole.

It is to be noted that the tubular cells 24, 25 and 26 are not mere isolated ribs, but their surfaces are merged in with the entire inner surfaces of those portions of the skin 27 thereadjacent, and their adjacent vertical surfaces are similarly merged with each other.

Although the fluid plastic material so utilized may be identical with that utilized in making the preformed spar 13 and trailing edge element 19, and in the course of the assembling, curing and hardening, such fluid plastic material of the skin and wrapped tubes is brought into contact with the entire outer surfaces of the spar 13 and trailing edge portion 19 save for their ends, the bond thereby obtained may not be of the same substantially integral nature as that of the tubular cells 24, 25 and 26 to each other and to the skin 27. However, it is nevertheless a highly reliable bond for transfer of shear loads, as compared to commonly utilized adhesive bonds, and is adequate for the following reasons:

Inasmuch as the tubular cells 24, 25 and 26 are substantially integral with the skin 27 after the structure is cured, they restrain flexure of the skin 27 relative to the aft edge of the spar 28, such as would be caused by blade loads and vibrations if ordinary chordwise ribs were utilized. Further, vertical shear loads are carried to the spar 13 by the forward cell wall 28 and transferred over its entire surface to the contacting aft surface 14 of the spar 13. Similarly, flexure of the skin 27 forwardly adjacent the heavy trailing edge element 19 is restrained by the upper and lower walls of the tubular cell 26 and shear transfer takes place between the aft vertical surface 29 of the cell 26 and the forward vertical surface 20 of the trailing edge element 19.

Shear loads attendant torsion and chordwise bending are transferred to the spar 13 by the inner surfaces of the molded skin 27 in contact with the entire contoured leading edge surface 15 of the spar 13, and the upper and lower trailing edge element surfaces 21, 22 participate in a similar transfer of shear to the skin 27. The preforms 13 and 19 are thus encased entirely within the integral reinforced structure and bonded therein over their entire spanwise-extending surface areas by the very plastic material which unifies the skin 27 and cells 24, 25, 26. Thus the unique structure and the process hereof result in a reliable coaction between the portions which are substantially integral and the preformed portions which, because of being preformed, are conservatively considered as somewhat dissimilar. All-plastic rotor blades have thus been manufactured with the advantages that flow from utilization of the same plastic materials in the preforms and skin, yet without danger of delamination or bond failure. Thick leading edge portions and thin aft structure, which could not be satisfactorily molded simultaneously because of their differences in thickness, are made to function together in a highly satisfactory manner.

The inventive principles hereof are not limited in their application to the specific materials mentioned, nor to the particular use disclosed. Instead, the present invention is to be considered as fully coextensive with the claims hereof.

I claim:

1. A method of manufacturing plastic rotor blades of the type having a spar and having aft thereof one or more hollow spanwise cells whose walls are thinner than the spar, comprising the steps of pre-molding and curing a spar composed of laminable sheet material and fluid plastic so that the spar has an aft-presented surface, then coating laminable sheet material with fluid plastic, wrapping such coated material on as many spanwise mandrels as the number of such cells to be formed, assembling such wrapped mandrels in position adjacent and aft of such pre-molded, pre-cured spar and with the adjacent surfaces in contact with each other, wrapping around the exterior of such assembly a further quantity of such coated material, and then curing all such wrapped fluid plastic-coated material substantially simultaneously.

2. A method of manufacturing plastic rotor blades of a type having one or more spanwise cells joining a forward spanwise structural element and an aft spanwise laminated plastic structural element, the thickness of each of which substantially exceeds that of the walls of such cells, comprising the steps of pre-molding and curing laminated plastic, spanwise, forward and aft structural elements, so that the forward element has an aft surface and the aft element has a forward surface, then wrapping a number of spanwise mandrels equal to the number of such cells with laminable material coated with fluid plastic, the shape of such mandrels corresponding with the hollows of the cells to be formed, then, without hardening the fluid plastic material, assembling such wrapped mandrels in chordwise relation and contact between the aft surface of the forward structural element and the forward surface of the aft structural element, then wrapping around the exterior of the assembly a further quantity of such laminable material so coated with such fluid plastic, and then molding the assembly so wrapped to the desired blade contour and curing simultaneously all the said fluid plastic-coated material.

References Cited in the file of this patent

UNITED STATES PATENTS

| | | |
|---|---|---|
| 1,389,143 | Kempton | Aug. 30, 1921 |
| 1,393,541 | Kemp | Oct. 11, 1921 |
| 2,020,759 | Atwood | Nov. 12, 1935 |
| 2,183,158 | Bennett | Dec. 12, 1939 |
| 2,265,366 | Hafner | Dec. 9, 1941 |
| 2,362,301 | Pecker | Nov. 7, 1944 |
| 2,381,631 | Waring | Aug. 7, 1945 |
| 2,451,131 | Vidal | Oct. 12, 1948 |
| 2,454,719 | Scogland | Nov. 23, 1948 |
| 2,484,141 | Alex | Oct. 11, 1949 |
| 2,519,036 | Ford | Aug. 15, 1950 |
| 2,588,570 | Pitcairn | Mar. 11, 1952 |
| 2,589,786 | Engel | Mar. 18, 1952 |
| 2,593,714 | Robinson | Apr. 22, 1952 |
| 2,659,444 | Stanley | Nov. 17, 1953 |
| 2,755,216 | Lemons | July 17, 1956 |

FOREIGN PATENTS

| | | |
|---|---|---|
| 865,382 | France | Feb. 24, 1941 |